DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 417

T901,024
VENTED TOBACCO SMOKE FILTER CONTAINING METAL OXIDES

Cephas H. Sloan, Rte. 5 37460, and Gerald P. Morie, 2317 Briarcliff Road 37660, both of Kingsport, Tenn.

Filed Sept. 27, 1971, Ser. No. 184,195
**Int. Cl. A24d *1/04***
U.S. Cl. 131—266
No Drawing. 6 Pages Specification

Tobacco smoke filter containing an additive of mixed metal oxides such as hopcalite for the selective removal of oxides of nitrogen (NO and $NO_2$) from tobacco smoke. The metal oxides may be primarily the oxides of manganese and copper, with small amounts of the oxides of chromium, iron, silver, cobalt, zinc, palladium and cadmium. The filter additives may be employed as granules of the metal oxide mixture, or as powders and they may be impregnated on a solid support such as alumina. The granules should have a surface area of 25 to 500 $m.^2/g.$ and pores with diameters ranging from 5 A. to 100 A. The additive may be applied to filtering material such as cellulose acetate tow or as one component of a multicomponent filter. Further, the filter may be vented to allow from 10 to 40% dilution of the smoke and should be designed so that air entering the filter through the vents does not enter the smoke stream in front of the chamber containing the filter additive. The venting is conveniently achieved with an inner chamber which channels fresh air around the periphery of the filter and into the smoker's mouth.